UNITED STATES PATENT OFFICE.

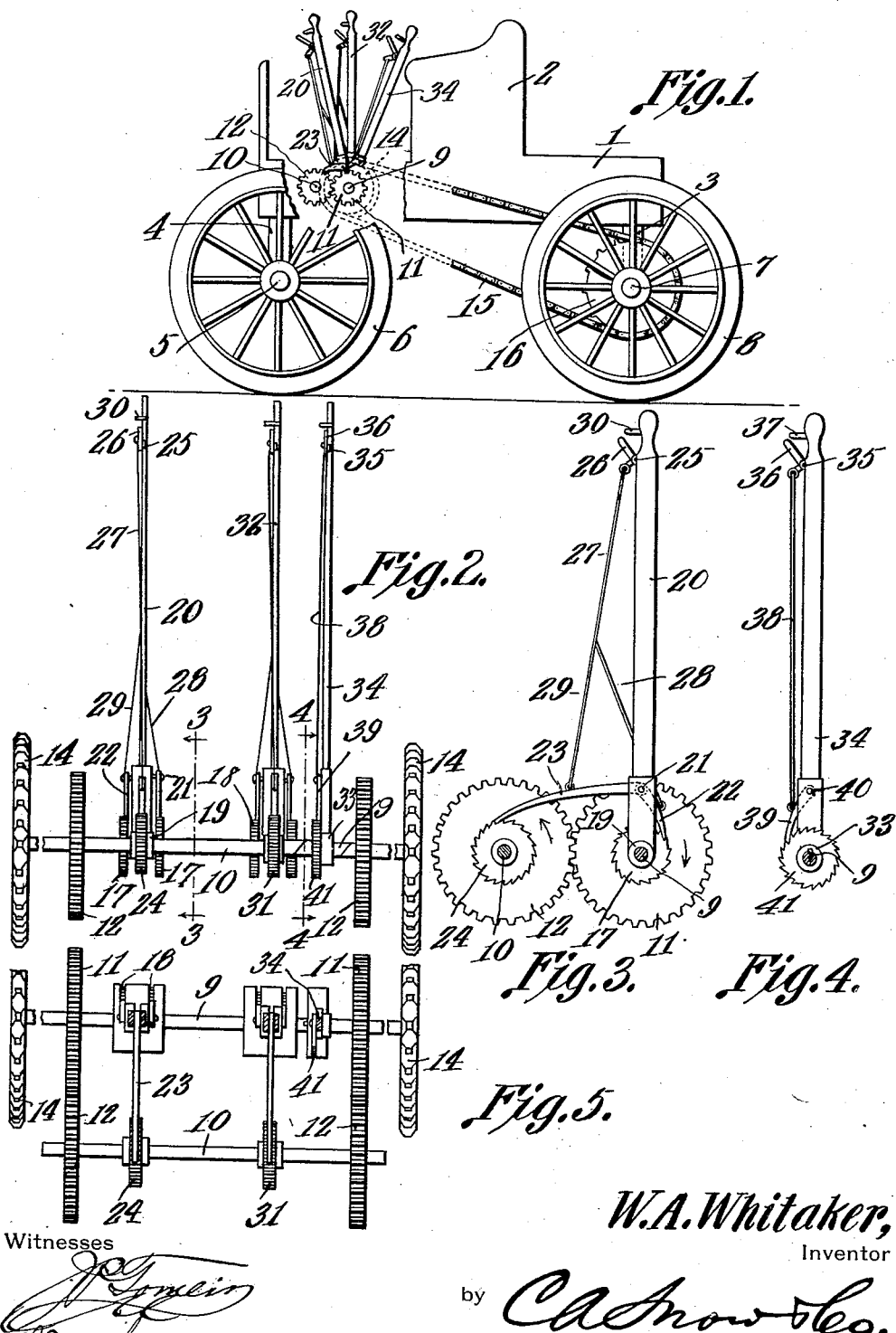

WILLIAM A. WHITAKER, OF SPRINGFIELD, MISSOURI.

PROPELLING DEVICE OF POLYCYCLES.

1,058,123. Specification of Letters Patent. Patented Apr. 8, 1913.

Application filed May 6, 1912. Serial No. 695,422.

*To all whom it may concern:*

Be it known that I, WILLIAM A. WHITAKER, a citizen of the United States, residing at Springfield, in the county of Greene and State of Missouri, have invented a new and useful Propelling Device of Polycycles, of which the following is a specification.

The objects of the present invention are to provide a novel form of driving mechanism for a vehicle, whereby continuous rotary motion may be imparted to interengaged shafts, means being provided for reversing the direction of the drive.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings:—Figure 1 shows the invention in side elevation, parts being broken away; Fig. 2 is an elevation of the main and auxiliary shafts and parts carried thereby, portions being broken away; Fig. 3 is a section upon the line 3—3 of Fig. 2; and Fig. 4 is a section upon the line 4—4 of Fig. 2. Fig. 5 is a plan of the structure shown in Fig. 2, parts being broken away.

The supporting structure, in the present instance shown in the form of a wagon body, may be of any desired sort. As shown, the wagon body 1 is provided with a seat 2. Depending from the wagon body 1 are brackets 3 and 4. A front axle 5 is carried by the bracket 4, the front axle 5 supporting the front wheels 6. The rear axle 7 is carried by the bracket 3, the rear axle 7 supporting the rear wheels 8.

Journaled for rotation in the body 1 is a main shaft 9, and journaled in the wagon body 1 near the main shaft 9 is an auxiliary shaft 10. There are pinions 11 upon the main shaft 9 which mesh into pinions 12 upon the auxiliary shaft 10. The main shaft 9 is provided at its extremities with sprocket wheels 14 about which are trained sprocket chains 15 which are engaged with sprocket wheels 16, the sprocket wheels 16 being operatively connected with the rear wheels 8.

A pair of ratchet wheels 17 are secured to the main shaft 9, the main shaft 9 carrying another pair of ratchet wheels 18. A bearing 19 is journaled upon the shaft 9 between the ratchet wheels 17. Fixed to the bearing 19 is a lever 20. A pivot element 21 is carried by the lever 20, the pivot element 21 serving as a support for primary pawls 22 which engage the ratchet wheels 17. A secondary pawl 23 is also mounted upon the pivot element 21, the secondary pawl 23 extending forwardly into engagement with the teeth of a ratchet wheel 24 which is secured to the secondary shaft 10. The pawls 22 and 23 extend in opposite directions from the pivot element 21 and the teeth of the ratchet wheels 17 and 24 face in opposite directions.

Fulcrumed at 25 upon the upper end of the lever 20 is a trip lever 26 preferably in the form of a bell crank, one arm of which is connected with a trip member 27 having branches 28 which are connected with the primary pawls 22. Another branch 29 of the trip member 27 is connected with the secondary pawl 23. Projecting from the lever 20 adjacent its upper end is a resilient catch 30 with which the free upper end of the bell crank 26 may be engaged, for a purpose which will be set forth hereinafter.

Secured to the auxiliary shaft 10 in front of and between the ratchet wheels 18 of the main shaft 9 is a ratchet wheel 31. The mechanisms for operating and controlling the ratchet wheels 18 and 31 are identical with the mechanisms hereinbefore described in connection with the ratchet wheels 17 and 24. For convenience in description, however, the lever whereby the ratchets 18 and 31 are actuated is designated specifically by the numeral 32.

Journaled upon the main shaft 9 to one side of the ratchet wheels 18 is a sleeve 33 carrying a reverse lever 34 to the upper end of which is pivoted as shown at 35 a bell crank 36, adapted to be engaged by a spring catch 37. A trip member 38 is connected with the bell crank 36, the lower end of the trip member 38 being connected with a pawl 39, pivoted at 40 to the lever 34, the pawl 39 being adapted to engage a ratchet wheel 41 fixed to the main shaft 9. The teeth in the ratchet wheel 41 face in an opposite direction from the teeth of the pinions 17 and 18.

The practical operation of the device hereinbefore set forth is as follows: Ordinarily, the upper end of the lever 20 is thrust forwardly at the same time that the upper end of the lever 32 is drawn backwardly, in order to impart a substantially continuous motion to the main shaft 9. With the foregoing arrangement in mind, the lever 32 may be omitted from the discussion. When the lever 20 is swung at its free end in one direction the pawls 22 will engage the ratchet wheels 17 and rotate the main shaft 9, motion being transmitted from the main shaft 9 to the auxiliary shaft 10 through the medium of the intermeshing pinions 11 and 12. When the upper, free end of the lever 20 is swung in an opposite direction, motion will be transmitted through the medium of the pawl 23 and the ratchet wheel 24 to the auxiliary shaft 10 and from the auxiliary shaft 10 into the main shaft 9 through the intermeshing pinions 11 and 12, a substantially continuous rotation being thus imparted to the main shaft 9. From the main shaft 9 motion will be transmitted to the sprocket wheels 14, to the sprocket chains 15, and thence by way of the sprocket wheels 16 to the rear wheels 8, thus securing a propulsion of the vehicle. When it is desired to reverse the direction of travel of the vehicle, the bell cranks 26 are swung upwardly into engagement with the latches 30, thus holding the pawls 22 and 23 out of engagement with the ratchet wheels 17 and 24, respectively. The reverse lever 34 is then manipulated, whereupon its pawl 39 will engage the ratchet wheel 41 upon the main shaft 9 and impart to the main shaft a rotation opposite in direction to that procured through the medium of the levers 20 and 32.

Having thus described the invention, what is claimed is:—

1. In a device of the class described, a vehicle body; a propulsion wheel carried thereby; main and auxiliary shafts supported for rotation by the vehicle body; means for operatively connecting the main shaft with the propulsion wheel; intermeshing pinions upon the shafts; ratchet wheels upon the shafts, the ratchet wheels of the respective shafts facing in opposite directions; an operating lever fulcrumed upon the main shaft; pawls carried by the operating lever, one pawl engaging the ratchet wheel of the main shaft and one pawl engaging the ratchet wheel of the auxiliary shaft; means for disengaging the pawls from their respective ratchet wheels; and a device upon the main shaft for imparting to the main shaft a rotation opposite in direction to that secured by a manipulation of the operating lever.

2. In a device of the class described, a vehicle body; a propulsion wheel carried thereby; main and auxiliary shafts supported for rotation by the vehicle body; means for connecting the main shaft with the propulsion wheel; intermeshing pinions upon the shafts; ratchet wheels upon the shafts; an operating lever fulcrumed upon the main shaft; pawls carried by the operating lever and adapted to engage the ratchet wheels, respectively, the teeth of the ratchet wheels facing in opposite directions; a ratchet wheel upon the main shaft, the teeth of the last mentioned ratchet wheel facing in an opposite direction from the teeth of the first mentioned ratchet wheel upon the main shaft, said ratchet wheel constituting a reversing ratchet wheel; a reversing lever fulcrumed upon the main shaft; and a pawl adapted to engage the reversing ratchet wheel.

3. In a device of the class described, a vehicle body; a propulsion wheel carried thereby; main and auxiliary shafts supported for rotation by the vehicle body; means for operatively connecting the main shaft with the propulsion wheel; intermeshing pinions upon the shafts; a ratchet wheel upon the main shaft; a ratchet wheel upon the auxiliary shaft; a lever fulcrumed upon the main shaft; pawls carried by the lever, one pawl being adapted to engage the ratchet wheel of the main shaft and the other pawl being adapted to engage the ratchet wheel of the auxiliary shaft, the teeth of the ratchet wheels facing in opposite directions; means carried by the lever for disengaging both ratchets from their respective ratchet wheels; and pawl and ratchet mechanisms carried by the main shaft, the teeth of said pawl and ratchet mechanism facing in an opposite direction from the teeth of the first specified ratchet wheel upon the main shaft.

4. Driving mechanism comprising a supporting structure; main and auxiliary shafts journaled therein; intermeshing pinions upon the shafts; ratchet wheels upon the shafts, the teeth of the ratchet wheels of the respective shafts facing in opposite directions; a lever fulcrumed upon the main shaft; pawls upon the lever, adapted to engage the ratchet wheels, respectively; a ratchet wheel upon the main shaft, the teeth of which face in an opposite direction from the teeth of the first specified ratchet wheel of the main shaft; a lever fulcrumed upon the main shaft; and a pawl carried by the last mentioned lever and adapted to engage the last specified ratchet wheel.

In testimony that I claim the foregoing as my own, I have hereto affixed my signature in the presence of two witnesses.

WILLIAM A. WHITAKER.

Witnesses:
E. R. KIDD,
F. A. MOUNTS.

Copies of this patent may be obtained for five cents each, by addressing the "Commissioner of Patents Washington, D. C."